US012774190B2

(12) United States Patent
Kantola et al.

(10) Patent No.: US 12,774,190 B2
(45) Date of Patent: Oct. 27, 2026

(54) ELEVATOR SYSTEM

(71) Applicant: KONE Corporation, Helsinki (FI)

(72) Inventors: Jari Kantola, Helsinki (FI); Jouni Lappalainen, Helsinki (FI); Lasse Nyman, Helsinki (FI)

(73) Assignee: KONE CORPORATION, Helsinki (FI)

(*) Notice: Subject to any disclaimer, the term of this patent is extended or adjusted under 35 U.S.C. 154(b) by 0 days.

(21) Appl. No.: 18/886,558

(22) Filed: Sep. 16, 2024

(65) Prior Publication Data

US 2025/0002299 A1 Jan. 2, 2025

Related U.S. Application Data

(63) Continuation of application No. PCT/EP2022/060243, filed on Apr. 19, 2022.

(51) Int. Cl.

*B66B 11/04* (2006.01)
*B66B 5/02* (2006.01)
*B66B 7/06* (2006.01)

(52) U.S. Cl.

CPC .......... *B66B 11/0415* (2013.01); *B66B 5/027* (2013.01); *B66B 7/068* (2013.01)

(58) Field of Classification Search

CPC ............ B66B 5/027; B66B 17/12; B66B 7/06
See application file for complete search history.

(56) References Cited

U.S. PATENT DOCUMENTS 11,702,317 B2 * 7/2023 Shi ........................... B66D 3/20 187/250
2002/0100645 A1 * 8/2002 Bloch ..................... B66B 5/027 187/311
2018/0290862 A1 * 10/2018 Copeland .................. B66B 7/06

FOREIGN PATENT DOCUMENTS

CN 203682804 U * 7/2014
CN 222781207 U * 4/2025
EP 3162751 A1 * 5/2017 ............ B66B 5/027
JP 50-160950 A 12/1975
JP 08099780 A * 4/1996

(Continued)

OTHER PUBLICATIONS

Machine Translation of JP 2012-153507.*

(Continued)

*Primary Examiner* — Diem M Tran

(74) *Attorney, Agent, or Firm* — Birch, Stewart, Kolasch & Birch, LLP

(57) ABSTRACT

According to an aspect, there is provided an elevator system comprising an elevator car configured to move in an elevator shaft; a counterweight associated with the elevator car, the counterweight configured to move in the elevator shaft; a compensation member coupled to the elevator car and the counterweight, the compensation member being diverted by a compensation pulley disposed in an elevator pit; and a manual rescue device disposed in the elevator shaft being mechanically coupled to the compensation member, the manual rescue device comprising an interface configured to receive a tool to operate the manual rescue device. A rotating axis of the manual rescue device is disposed in the elevator shaft at a location corresponding to an opening in the lowest landing floor to enable operation of the manual rescue device with the tool via the opening to move the elevator car in a rescue situation.

20 Claims, 2 Drawing Sheets

(56) References Cited

FOREIGN PATENT DOCUMENTS

| | | | | | |
|---|---|---|---|---|---|
| JP | 2003201074 | A | * | 7/2003 | |
| JP | 2005041649 | A | * | 2/2005 | |
| JP | 2005231837 | A | * | 9/2005 | |
| JP | 2011006218 | A | * | 1/2011 | |
| JP | 2011046456 | A | * | 3/2011 | |
| JP | 2012-41142 | A | | 3/2012 | |
| JP | 2012-153507 | A | | 8/2012 | |
| JP | 5163455 | B2 | * | 3/2013 | |
| JP | 2013119481 | A | * | 6/2013 | |
| WO | WO-2019146058 | A1 | * | 8/2019 | ............... B66B 5/00 |

OTHER PUBLICATIONS

International Preliminary Examination Report (PCT/IPEA/409), issued in PCT/EP2022/060243, dated Mar. 11, 2024.
International Search Report (PCT/ISA/210) issued in PCT/EP2022/060243, dated Nov. 28, 2022.
Written Opinion (PCT/ISA/237) issued in PCT/EP2022/060243, dated Nov. 28, 2022.

* cited by examiner

ELEVATOR SYSTEM

CROSS REFERENCE TO RELATED APPLICATIONS

This application is a Continuation of PCT International Application No. PCT/EP2022/060243, filed on Apr. 19, 2022, which is hereby expressly incorporated by reference into the present application.

BACKGROUND

Elevators of elevator systems are used to transport passengers in buildings. However, sometimes an elevator may become faulty while there is at least passenger inside an elevator car. For example, a power failure may interrupt an elevator car travel, causing the elevator car to stop between landing floors. In such a case, the elevator car has to be transferred to a rescue floor to release the passengers from the elevator car. This operation may sometimes be referred to as a rescue operation. In order to perform the rescue operation, a field technician travels to the elevator site, releases hoisting machine brakes and rotates hoisting machine manually with a mechanical lever.

Normally a hoisting machine associated with an elevator is located in the uppermost part of the elevator shaft, and a mechanical drive link may be arranged from the hoisting machine downwards to a lower part of the elevator shaft to allow the rescue operation without having to climb up the to the hoisting machine.

This kind of solution is, however, complicated and expensive because of the mechanical drive link, and introduces additional and complicated mechanical elements that may also become faulty.

SUMMARY

According to a first aspect, there is provided an elevator system comprising an elevator car configured to move in an elevator shaft; a counterweight associated with the elevator car, the counterweight configured to move in the elevator shaft; a compensation member coupled to the elevator car and the counterweight, the compensation member being diverted by a compensation pulley disposed in an elevator pit; and a manual rescue device disposed in the elevator shaft being mechanically coupled to the compensation member, the manual rescue device comprising an interface configured to receive a tool to operate the manual rescue device. A rotating axis of the manual rescue device is disposed in the elevator shaft at a location corresponding to an opening in the lowest landing floor to enable operation of the manual rescue device with the tool via the opening to move the elevator car in a rescue situation. This can mean that a rescue operation may be performed entirely from outside of the elevator shaft, without a serviceman entering the shaft.

In an implementation form, the interface is configured to receive a mechanical tool.

In an implementation form, the interface is configured to receive an electrical tool.

In an implementation form, the elevator system further comprises a control means comprising a rescue control means, wherein the control means is configured to enable access to the manual rescue device via the opening.

In an implementation form, the elevator system further comprises a landing door located at the lowest landing floor to provide an access from the landing floor into the elevator car located next to the landing door, i.e. when the car floor is substantially at the same level with the landing floor. The landing door comprises a door locking mechanism designed to prevent a manual opening of the landing door into the elevator shaft, i.e. when car is not next to the landing door and opening of the door would enable intrusion into the shaft, in particular into the pit. A manual opening of the landing door may be prevented either permanently or at least until movement of the elevator car has been arrested by means of mechanical safeties, such as a safety gear or a safety buffer. With this kind of design the safety of maintenance and rescue operations may be increased, especially when the rescue operation is performed entirely from outside of the elevator shaft.

In an implementation form, the manual rescue device is configured to be movable between an operating position in which the rescue device is mechanically coupled to the compensation member and an inactive position in which the device is disconnected from the compensation member.

According to a second aspect, there is provided a rescue method in an elevator system. The method comprises setting an elevator car to a rescue control mode via a rescue control means; opening, using the rescue control means, hoisting machinery brakes to allow a movement of the elevator car; and operating, with a tool via an opening, a manual rescue device disposed in the elevator shaft being mechanically coupled to a compensation member via an interface configured to receive the tool to move the elevator car in a rescue situation.

In an implementation form, the tool comprises a mechanical tool.

In an implementation form, the tool comprises an electrical tool.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates an elevator system that enables a rescue operation in a machine roomless elevator, in particular for elevators with a low or substantially non-existent pit depth.

Figure 1A:
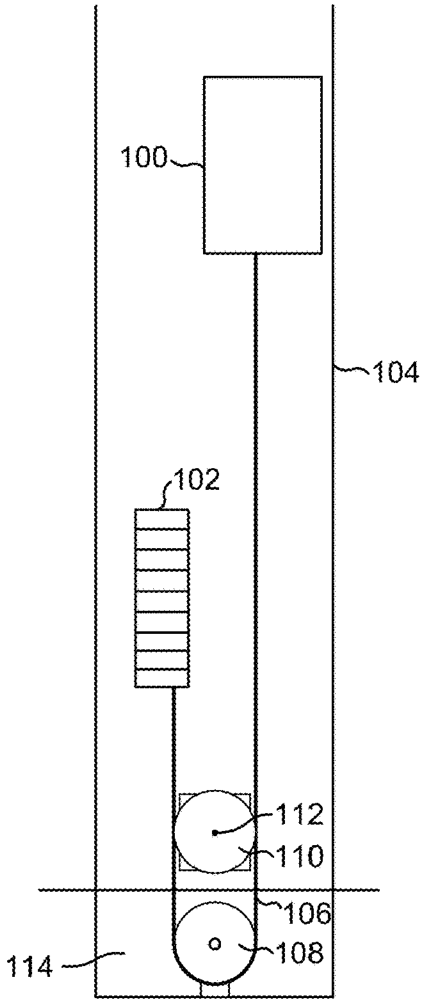
FIG. 1A illustrates an elevator system according to an example embodiment.
Figure 1B:
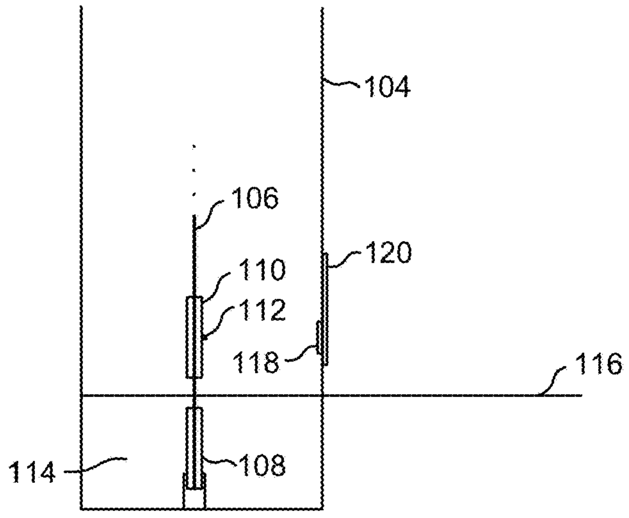
FIG. 1B illustrates a side view of an elevator system according to an example embodiment.

FIG. 1A illustrates an elevator system according to an example embodiment. FIG. 1B illustrates a side view of the elevator system according to an example embodiment.

The elevator system elevator comprises a hoisting machine that may be disposed in an uppermost portion of an elevator shaft 104. The elevator system further comprises an elevator car 100 and a counterweight 102 suspended by means of hoisting ropes, which run via a traction sheave of the hoisting machine. The elevator car 100 is arranged to travel in the elevator shaft 104 through a plurality of landings by means of a driving torque generated with the hoisting machine.

In an example embodiment, there may be a reduced or substantially eliminated pit depth 114 in the elevator shaft 104 such that there is no natural safety space in the pit 114 under the lowermost landing for a service technician. This means that an access from the lowermost landing 116 into the shaft 104 or pit 114 to perform a maintenance and/or rescue operation is not possible, and maintenance and/or rescue operations are to be performed from elsewhere, for example, from the lowermost landing 116 outside of the elevator shaft 104.

The elevator system further comprises a longitudinal compensation member 106 coupled to the elevator car 100 and the counterweight 102, longitudinal compensation member 106 extending downwards from the counterweight 102 and the elevator car 100. The compensation member 106 may diverted by a compensation pulley 108 disposed in the bottom of the pit 114. In an example embodiment, the compensation member 106 may comprise a rope, a chain or a belt.

The elevator system further comprises a manual rescue device 110 disposed in the elevator shaft 104, and the manual rescue device 110 is mechanically coupled to the compensation member 106. The manual rescue device 110 comprises interface 112 configured to receive a tool to operate the manual rescue device 110. The interface 112 may be shaped such that it is able to receive a manually operated mechanical tool or an electrical tool. The term "mechanically coupled" may refer to an implementation in which the manual rescue device 110 contacts the compensation member 106 such that, when the manual rescue device 110 is operated via the interface 112, the manual rescue device 110 is able to move the elevator car 100 in the elevator shaft 104. In an example embodiment, the manual rescue device 110 may comprise a sheave, a sprocket or a corresponding structure or element that is mechanically coupled to the compensation member 106. A rotating axis of the manual rescue device 110 may be disposed in the elevator shaft 104 at a location corresponding to an opening 118 in the lowest landing floor 116 to enable operation of the manual rescue device 110 with the tool via the opening 118 to move the elevator car 100 in a rescue situation. In other words, the sheave or sprocket of the manual rescue device 110 can be rotated and a rescue operation can be performed from the adjacent landing 116. The size of the opening 118 may be sized such that it is possible to reliably extend the tool inside the elevator shaft 104 towards the interface 112.

In an example embodiment, the lowest landing floor 116 may comprise a control means 120 comprising a rescue control means, wherein the control means is configured to enable access to the manual rescue device via the opening 118. The rescue control means may refer, for example, to a control cabinet or a hatch, which provides the opening 118 into the elevator shaft 104 through the shaft wall. The control cabinet or hatch may have a locking means to seal or lock the opening 118 and thus to prevent an unauthorized access before or after the rescue operation. In an example embodiment, the rescue control means may comprise at least one other control function needed for the rescue operation, for example, a status switch to set/cancel a rescue control mode and a manual brake opening button to electrically open the hoisting machinery brakes to allow movement of the elevator car 100 during the rescue operation.

In an example embodiment, the elevator system may further comprise a landing door located at the lowest landing floor 116 to provide an access from the landing floor into the elevator car located next to the landing door, i.e. when the elevator car floor is substantially at the same level with the landing floor. The landing door may comprise a door locking mechanism designed to prevent a manual opening of the landing door into the elevator shaft, i.e. when elevator car 100 is not next to the landing door and opening of the landing door would enable intrusion into the elevator shaft 104, in particular into the pit. A manual opening of the landing door may be prevented, for example, either permanently or at least until movement of the elevator car 100 has been arrested by means of mechanical safeties, such as a safety gear or a safety buffer. With this kind of design the safety of maintenance and rescue operations may be increased, especially when the rescue operation is performed entirely from outside of the elevator shaft 104.

Figure 2:
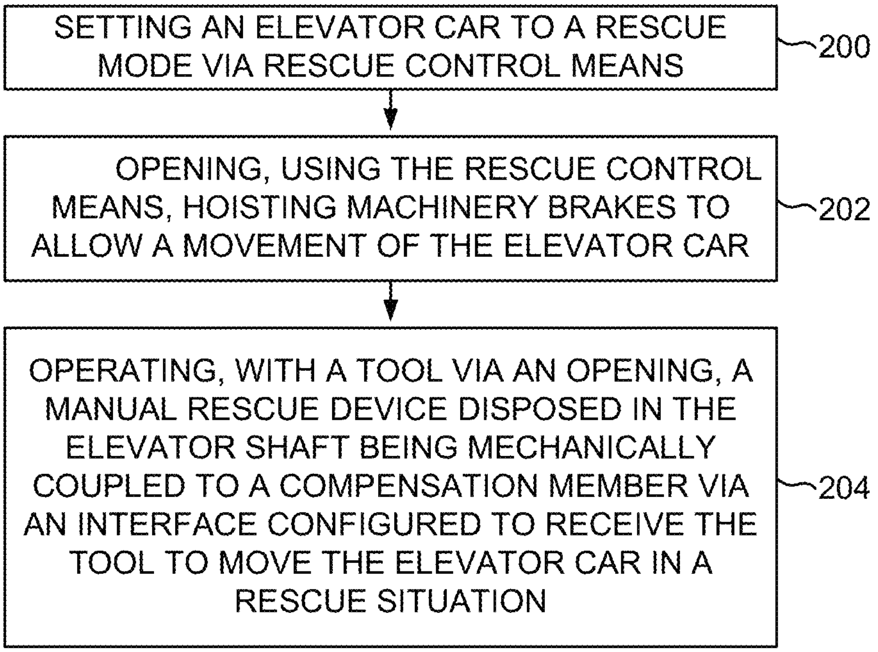
FIG. 2 illustrates a rescue method in an elevator system according to an example embodiment.

FIG. 2 illustrates a rescue method in an elevator system according to an example embodiment.

At 200, an elevator car may be set to a rescue control mode via a rescue control means. The rescue control means may comprise, for example, a status switch to set/cancel a rescue control mode.

At 202, hoisting machinery brakes may be opened, using the rescue control means, to allow a movement of the elevator car in the elevator shaft. The rescue control means may comprise, for example, a manual brake opening button to electrically open the hoisting machinery brakes to allow movement of the elevator car during the rescue operation.

At 204, a manual rescue device disposed in the elevator shaft being mechanically coupled to a compensation member via an interface configured to receive the tool to move the elevator car in a rescue situation may be operated, for example, by a technician or rescue personnel with a tool via an opening in the elevator shaft. The tool may comprise a mechanical or an electrical tool. In an example embodiment, the manual rescue device may also be transferrable or movable between an operating position in which the rescue device is mechanically coupled to the compensation member, and an inactive position in which the device is disconnected from the compensation member.

At least one of the example embodiments discussed above may enable a solution in which a rescue operation can be performed from an elevator landing without entering the elevator shaft. This may increase the safety of maintenance and rescue operations. Further, the illustrated solution enables a simple and reliable solution as no mechanical drive link is needed from the hoisting machine downwards to a lower part of the elevator shaft to allow the rescue operation.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. Moreover, it should be recognized that structures and/or elements shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator system, comprising:

an elevator car configured to move in an elevator shaft;

a counterweight associated with the elevator car, the counterweight being configured to move in the elevator shaft;

a landing door located at a lowest landing floor to close an access opening providing access from the lowest landing floor into the elevator car;

a compensation member coupled to the elevator car and the counterweight, the compensation member being diverted by a compensation pulley disposed in an elevator pit; and a manual rescue device disposed in the elevator shaft being mechanically coupled to the compensation member, the manual rescue device comprising an interface configured to receive a tool to operate the manual rescue device, wherein a rotating axis of the manual rescue device is disposed above the compensation pulley, wherein the manual rescue device is disposed above the lowest landing floor to enable operation of the manual rescue device with the tool via an opening at the lowest landing floor to move the elevator car, and wherein the interface faces the opening.

2. The elevator system of claim 1, wherein the interface is configured to receive a mechanical tool.

3. The elevator system of claim 2, further comprising a controller comprising a rescue controller, wherein the controller is configured to enable access to the manual rescue device.

4. The elevator system of claim 2, wherein the landing door comprises a door locking mechanism designed to prevent a manual opening of the landing door into the elevator shaft.

5. The elevator system of claim 2, wherein the manual rescue device is configured to be movable between an operating position in which the manual rescue device is mechanically coupled to the compensation member and an inactive position in which the manual rescue device is disconnected from the compensation member.

6. The elevator system of claim 1, wherein the interface is configured to receive an electrical tool.

7. The elevator system of claim 6, further comprising a controller comprising a rescue controller, wherein the controller is configured to enable access to the manual rescue device.

8. The elevator system of claim 6, wherein the landing door comprises a door locking mechanism designed to prevent a manual opening of the landing door into the elevator shaft.

9. The elevator system of claim 6, wherein the manual rescue device is configured to be movable between an operating position in which the manual rescue device is mechanically coupled to the compensation member and an inactive position in which the manual rescue device is disconnected from the compensation member.

10. The elevator system of claim 1, further comprising a controller comprising a rescue controller, wherein the controller is configured to enable access to the manual rescue device.

11. The elevator system of claim 10, wherein the landing door comprises a door locking mechanism designed to prevent a manual opening of the landing door into the elevator shaft.

12. The elevator system of claim 1, wherein the landing door comprises a door locking mechanism designed to prevent a manual opening of the landing door into the elevator shaft.

13. The elevator system of claim 1, wherein the manual rescue device is configured to be movable between an operating position in which the manual rescue device is mechanically coupled to the compensation member and an inactive position in which the manual rescue device is disconnected from the compensation member.

14. The elevator system of claim 1, wherein a bottom of the manual rescue device is disposed above a top of the compensation pulley.

15. The elevator system of claim 1, wherein the opening is above the lowest landing floor.

16. The elevator system of claim 1, wherein the opening is closed by a hatch.

17. A rescue method in an elevator system, the method comprising:

setting an elevator car to a rescue control mode via a rescue controller;

opening, using the rescue controller, hoisting machinery brakes to allow a movement of the elevator car;

operating, with a tool via an opening, a manual rescue device disposed in an elevator shaft being mechanically coupled to a compensation member via an interface configured to receive the tool to move the elevator car in a rescue situation; and accessing the manual rescue device with the tool through the opening, wherein the interface faces the opening, wherein a rotating axis of the manual rescue device is disposed above the compensation member, wherein the elevator shaft has a landing door located at a lowest landing floor to close an access opening providing access from the lowest landing floor into the elevator car wherein the manual rescue device is disposed above the lowest landing floor to enable operation of the manual rescue device with the tool to move the elevator car.

18. The method of claim 17, wherein the tool comprises a mechanical tool.

19. The method of claim 17, wherein the tool comprises an electrical tool.

20. The method of claim 17, wherein a bottom of the manual rescue device is disposed above a top of the compensation member.

* * * * *